United States Patent [19]
Horak

[11] 3,985,024
[45] Oct. 12, 1976

[54] ACOUSTIC EMISSION PROCESS AND SYSTEM FOR IMPROVED FLAW SOURCE LOCATION

[75] Inventor: Charles R. Horak, East Meadow, N.Y.

[73] Assignee: Grumman Corporation, Bethpage, N.Y.

[22] Filed: Feb. 28, 1975

[21] Appl. No.: 554,195

[52] U.S. Cl. .................................................. 73/71.4
[51] Int. Cl.² .......................................... G01H 1/00
[58] Field of Search .................. 73/88 AE, 67, 71.4; 181/125

[56] References Cited
UNITED STATES PATENTS 3,858,439   1/1975   Nakamura .......................... 73/71.4
3,919,883   11/1975  Nakamura et al. .................. 73/71.4

OTHER PUBLICATIONS

Nakamura, "Acoustic Emission Monitoring System for Detection of Cracks in Complex Structure", Materials Evaluation, vol. 29, No. 1, Jan. 1971, pp. 8–12.

*Primary Examiner*—Charles A. Ruehl
*Attorney, Agent, or Firm*—Morgan, Finnegan, Pine, Foley & Lee

[57] ABSTRACT

An acoustic emission process and system for improved flaw source location employing spatial filtration. Masterslave discrimination, rise time discrimination, and/or coincidence detection are integrated into a multichannel flaw source location system to reject unwanted signals. A computer provides calculation of the flaw source coordinates from the valid signals.

24 Claims, 4 Drawing Figures

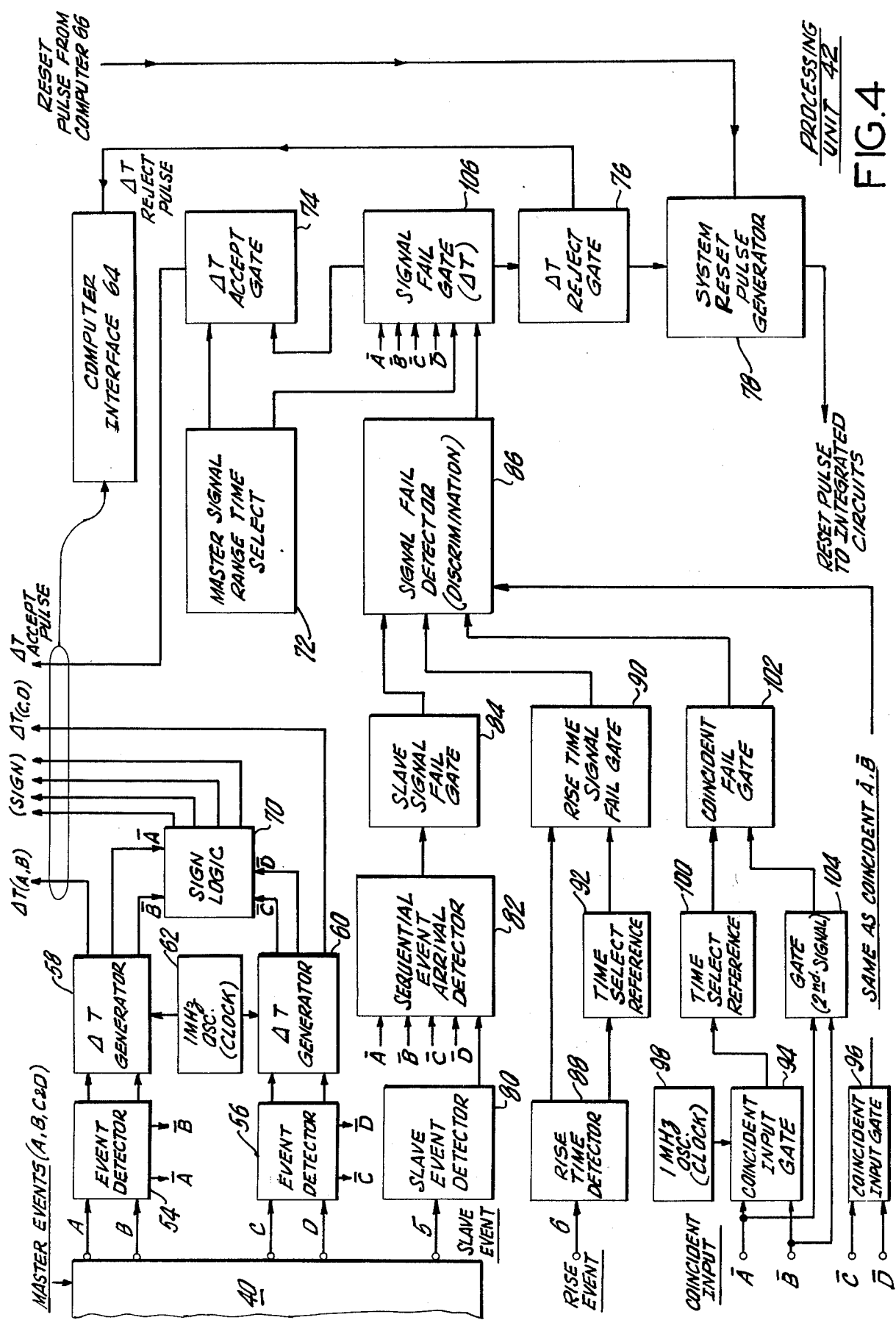

ACOUSTIC EMISSION PROCESS AND SYSTEM FOR IMPROVED FLAW SOURCE LOCATION

The present invention relates to flaw detection, and more specifically to a process and system for improved acoustic emission flaw source location. Acoustic emission is defined herein as the elastic energy released by a material as a result of deformation or fracture within the material.

Known acoustic emission flaw detection systems generally include an array of two or more transducers spaced for locating the source of all acoustic emissions within the boundaries of the array (within the boundaries of imaginary lines joining adjacent transducers). Triangular arrays of transducers for flaw location are also known. With these known systems, unwanted signals emanating from outside of the array, e.g., noise which enters the array, are detected by the transducers and give false locations within the array. Thus, with such systems extraneous noise can result in false flaw locations.

Various spatial filtration signal discrimination techniques have been used in total signal count rate systems. The first technique uses a configuration in which one transducer is a master and the others are slaves. Signals which are detected by a slave transducer prior to detection by the master are rejected and eliminated from the total count. This technique does not distinguish noise from valid signals or provide flaw location, but only provides a total signal count in accordance with the configuration. The second technique employs a pair of spaced transducers to accept signals occurring within a selected zone. This coincidence detection signal discrimination technique is used to make a comparison of the events, arrival time and amplitude when the event is detected through two channels. The signals are accepted or rejected on the basis of whether they occur coincidently within a selected time frame. This signal discrimination technique does not effectively eliminate all noise signals from sources outside the desired monitoring zone from registering as flaw signal event counts and does not provide flaw source location. The third technique employs rise time signal discrimination to count only signals which satisfy certain waveform requirements. The rising front envelope is examined and the signal is rejected if the rise time is greater than a predetermined rise time setting. This predetermined setting in effect rejects signals which originate beyond a specified radius from the sensing transducer, see U.S. Pat. No. 3,713,127 (Keledy et al.). Again, this discrimination technique does not provide flaw source location.

It is apparent from the previously discussed emission flaw location systems that unwanted signals are often detected which provide false indications of flaw locations. Moreover, the known signal discrimination techniques have been utilized in total signal count rate systems only and not in flaw source location systems.

It is an object of the present invention to provide an improved acoustic emission process and system for flaw source location.

It is a further object of the present invention to provide an improved process and system for acoustic emission flaw detection and location which eliminates substantially all unwanted signals.

It is a further object of the present invention to provide an improved process and system for acoustic emission flaw location interfacing spatial filtration with flaw source location.

It is a still further object of the present invention to reduce the amount of computer data processing required in flaw source location.

Other objects, aspects, and advantages of the present invention will be apparent from the detailed description considered with the drawings.

Briefly, the process for acoustic emission flaw location according to the present invention includes the steps of arranging at least two transducers in a spaced array to receive acoustic emission and noise signals, spatially filtering those signals received by the transducers which are beyond a predetermined signal source proximity to the transducers as determined by predetermined time relationships between the received signals, and processing the signals received by the transducers which are within the predetermined signal source proximity to the transducers as determined by the predetermined time relationships between the received signals to provide an accurate indication of acoustic emission flaw source location.

The system according to the present invention is illustrated in the accompanying drawings, in which:

FIG. 4 is a block diagram of the processing unit shown in FIG. 3.

Figure 1:
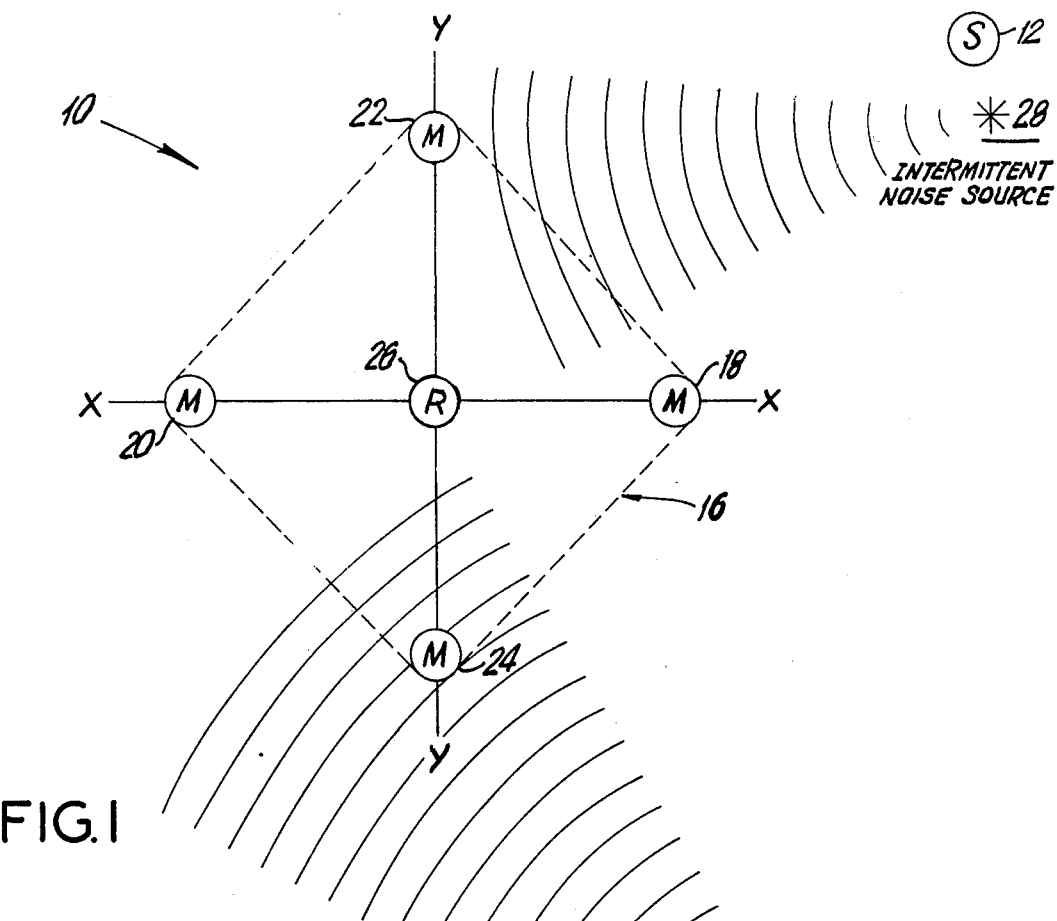
FIG. 1 is a top plan view of an acoustic emission transducer array according to the present invention utilizing master-slave and rise time discrimination.

Referring to FIG. 1, one embodiment of a transducer array according to the present inventin is generally illustrated at 10. The array 10 is shown for illustration purpose, to include two slave transducers 12 and 14, altough it should be understood the number of slave transducers may vary upwardly from one as desired. The slave transducers 12 and 14 may be piezoelectric transducers of the lead zirconate-titanate type, such as Nortec NDT-DZ410. The array 10 also includes an inner array 16 of master transducers 18, 20, 22, and 24 positioned at the extremities of perpendicular X–Y axes, in the same plane as transducers 12 and 14. Master transducers 18 and 20 are positioned at the extremities of the X axis and master transducers 22 and 24 at the extremities of the Y axis to form coordinate pairs, as will be more fully explained below. However, it should be understood that the number of master transducers employed in the inner array 16 may vary upwardly from two as desired. The master transducers 18–24 may be piezoelectric transducers of the lead-zirconate-titanate type, such as Nortec NDT-DZ410. The array 10 also includes a rise time transducer 26 positioned at the center of the inner array 16 in the same plane as slave transducers 12 and 14. The rise time transducer 26 causes rejection of the signals received by the master transducers 18–24 when the rise time of the acoustic signal received by the rise time transducer is greater than a predetermined maximum rise time.

The array 10 is mounted directly on a workpiece with any one of a number of conventional adhesive or mechanical mounting techniques.

It is known that flaws (dislocations and cracks) in workpieces are incremental, i.e., they occur in discrete steps rather than continuously. Upon the occurrence of a crack or dislocation acoustic energy in the form of low-level stress waves is released and propagated in the material. The released acoustic energy varies in amplitude in accordance with the magnitude of the dislocation or crack, and it varies in frequency from the audio part of the acoustic spectrum into the megahertz range. Detection and location of this phenomena enables, e.g., predictions to be made as to when and where the workpiece will fail and provides the opportunity to prevent such failure.

Figure 3:
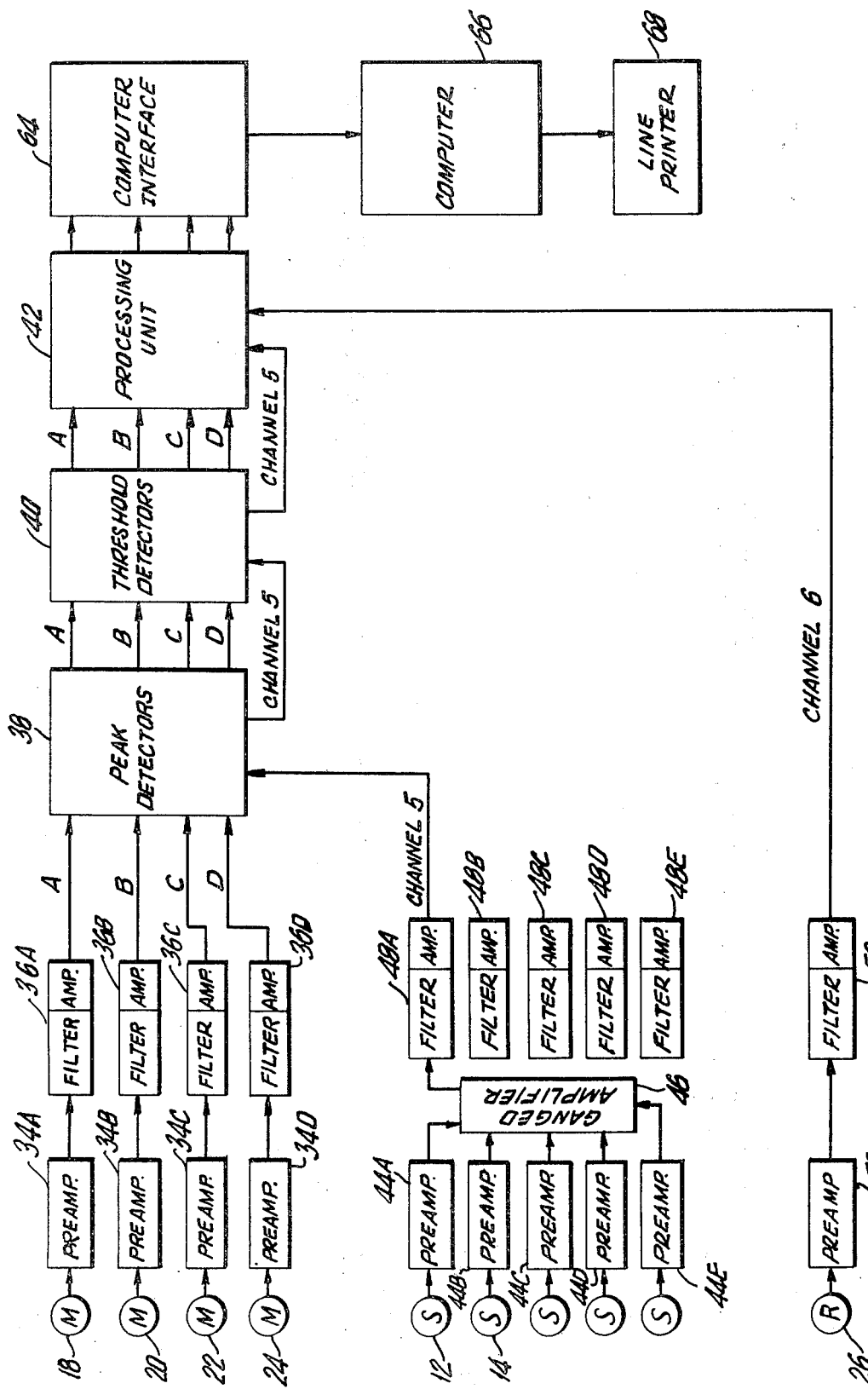
FIG. 3 is a schematic view of the signal processing means for the arrays of FIGS. 1 and 2.

All the transducers in the array 10 convert the resulting low-level stress waves emanating from the flaws into electrical signals which are processed in accordance with FIG. 3.

The area of surveillance of the array 10 is indicated by imaginary lines connecting adjacent master transducers 18–24, i.e., the area of the inner array 16. The slave transducers 12 and 14 are used as "slave channels," such that any signals received by one of these slave transducers 12–14 prior to detection by all four master transducers 18–24 (master channels) results in rejection of the location signals subsequently received by the master transducers 18–24. Thus, noise signals emanating from intermittent noise source 28 and 30 which are outside of the area of surveillance 16 are definitely rejected.

Figure 2:
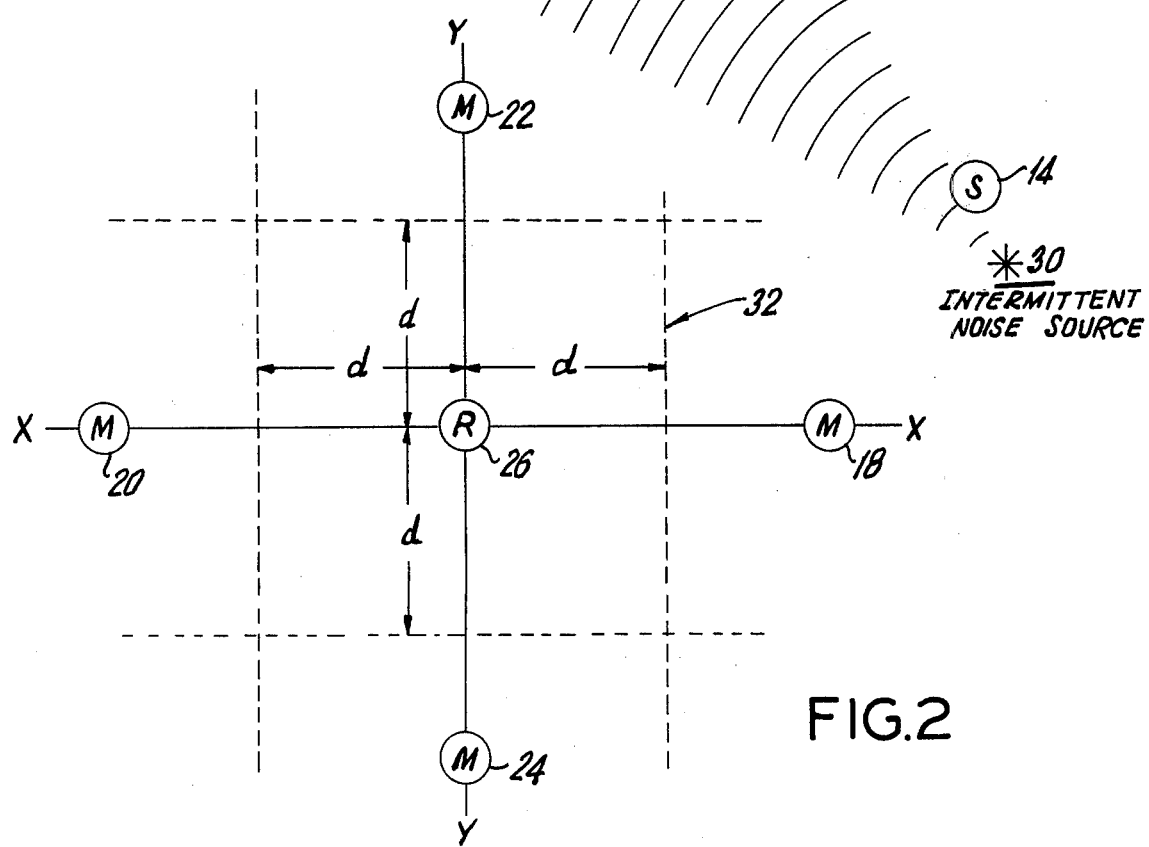
FIG. 2 is a top plan view of another acoustic transducer array according to the present invention, utilizing coincidence detection and rise time discrimination.

Referring to FIG. 2, the master transducers 18–24 may be switched to connect with logic circuitry, which will be explained more fully with reference to FIGS. 3 and 4, to provide a comparison of signal events and arrival time, so that signals which do not occur coincidently within a selected time frame are rejected. This enables the area of surveillance of the transducers 18–24 to be limited without physically moving the transducers 18–24. The maximum time frame corresponds to a distance 2D, where D is the distance from the center of the array 10 to each master transducer 18–24. The distance D is adjustable from less than one inch to a maximum of many feet. As shown in FIG. 2, the time frame is chosen so that the distance $d = \frac{1}{2}D$, i.e., the time frame is D. Therefore, signals received by the master transducers 18–24 which are outside the selected time frame, the surveillance area 32, will be rejected. Moreover, if the rise time of the wave front envelope detected by the rise time transducer 26 is above a predetermined value, the location signals detected by the master transducers 18–24 are rejected. Since the rise time of a wave front envelope increases with distance from the signal source, the signals will be rejected if the rise time is greater than the pre-selected value for the array. Thus, signals which originate from outside the area of surveillance for the "Master Channels" will be rejected after detection by the "Master Channels."

The spatial filtration techniques described above may be used individually or in any combination desired as required by workpiece geometry and test environment.

Referring to FIG. 3, each master channel transducer 18–24 is electrically connected through a preamplifier 34 A–D, such as Nortec NDT257, and amplifiers 36 A–D, such as Nortec NDT251, to peak detectors 38A–D and threshold detectors 40 A–D respectively. The peak detectors 38A–D, as is well known in the art, detect the peak amplitude or envelope of the signals received by the master transducers 18–24. The threshold detectors 40 A–D, as is well known in the art, provide output pulses whose leading edges coincide in time with a rise in the first peak of the received acoustic emission signals which is above a predetermined threshold level.

The four output pulses from the threshold detectors 40 A–D, corresponding to the transducers 18–24, are used to determine the differences in the time of arrival of the acoustic emission signals. These pulses may be, e.g., positive 5V logic pulses. The outputs of the threshold detectors 40 A–D are electrically coupled to a processing unit 42, which will be explained in more detail with reference to FIG. 4. The outputs from the slave transducers 12 and 14, and any others used, three additional slave transducers are shown in FIG. 3, may be connected through a preamplifier 44 A–E, such as a Nortec NDT 257, or ganged through a unity gain amplifier 46 and applied to the peak detectors 38, threshold detectors 40, and to the processing unit 42 through filter amplifiers 48 A–E, such as a Nortec NDT 251.

The output from the rise time transducer 26 is connected to a preamplifier 50, and filter-amplifier 52 to the processing unit 42.

Referring to FIG. 4, the location of acoustic emissions is obtained by integrated circuits in the processing unit 42. The signal events from the threshold detectors 40A–D are applied to event detectors 54 and 56, which may include a dual input flip-flop. Channels A and B are connected to event detector 54 and channels C and D to event detector 56.

The event detector 54 is electrically coupled to a $\Delta T$ generator 58 and the event detector 56 is electriclly coupled to a $\Delta T$ generator 60. The $\Delta T$ generators 58 and 60 may include a multiple input gate. The first signal event A or B received by the event detector 54 enables a 1 MHz oscillator or clock 62 which emits pulses until receipt of the second signal event A or B. The $\Delta T$ generator 58 then generates a pulse train having a duration $\Delta T$ and representing the time difference between the signal events A and B determined by the clock 62. The operation of the $\Delta T$ generator 60 with respect to signal events C and D is the same.

The $\Delta T$ data from the $\Delta T$ generators 58 and 60 is applied to the computer interface 64 and registered in the counters therein. Additionally, the output of the event detectors 54 and 56 is gated such that the sign logic is determined to represent the signal events A, B and by sign logic circuitry 70, which may include a multiple input gate. These sign signals are also applied to the computer interface 64.

If no spatial filtration reject signals are generated in the processing unit 42, the data set ($\Delta T$s and signs) is transferred from the counters of the computer interface 64 to the memory of the computer 66. This is accomplished by master signal range time select 72, which may include a switching RC circuit having adjustable time constants to set a range time for receiving all the signal events. At the end of the range time the master signal range time select 72 provides a pulse to $\Delta T$ accept gate 74. In the absence of an inhibit pulse, the $\Delta T$ accept gate 74 provides a $\Delta T$ accept pulse to the computer interface 64 which transfers the data set from the counters of the computer interface 64 to the memory of the computer 66. The computer 66 then generates a reset pulse to reset the integrated circuits in the system which require reset signals.

If spatial filtration reject signals are generated in the processing unit 42, the $\Delta T$ accept gate 74 is not enabled, but instead a $\Delta T$ reject gate 76 is enabled to provide a $\Delta T$ reject pulse which is applied to the computer interface 64. This $\Delta T$ reject pulse prevents transfer of the data set from the computer interface 64 to the memory of the computer 66. Additionally, the ΔT reject gate 76 activates a pulse generator 78 which applies a reset pulse to reset the integrated circuits in the system which require reset signal.

A slave event detector 80, which may include a dual input flip-flop, receives any slave signal present at channel 5. This slave signal as well as signals of channels 1–4 (A–D) are applied to a sequential event arrival detector 82, which may include a multiple input gate. If a slave signal is applied to the sequential event arrival detector 82 prior to the application of signals on all of the channels 1–4 (A–D), a pulse is applied to a slave signal fail gate 84. The slave signal fail gate 84 supplies a pulse to a signal fail detector 86, which may include a multiple input gate.

A rise time detector 88, which may include a ramp generator and precision comparator circuit, receives input signals from the rise time transducer 26 (channel 6). The rise time detector 88 generates a pulse each time the peak of a signal waveform is greater than the preceding peak. The output signals from the rise time detector 88 are applied to a rise time signal fail gate 90 and also to a time select reference 92, which may be an RC circuit. The time select reference 92 applies signals to the rise time signal fail gate 90 during the selected time period. If a signal from the rise time detector 88 is present at the input of the rise time signal fail gate 90 at the end of the time select reference, e.g., 10 to 250 microsec., the rise time signal fail gate 90 is enabled and a pulse is applied to the signal fail detector 86.

The signals present in event detector 54 (A and B) and event detector 56 (C and D) are applied to coincident input gates 94 and 96, respectively. The first signal (A or B) applied to the coincident input gate 94 enables a 1 MHz oscillator or clock 98. The output of the coincident input gate 94 is applied to a time select reference 100, whih may be an RC circuit, which provides output pulses to a coincident fail gate 102 during the period of the time constant, e.g, from 0 to the selected limit in steps of 1 microsecond. The second signal (A or B) is applied to a gate 104 which is electrically coupled to coincident fail gate 102. If the output pulse from the gate 104 is received by the coincident fail gate 102 during the application of pulses the time select reference 100, the coincident fail gate 102 is not enabled. However, if a pulse is received from the gate 104 after the pulses from the time select reference 100 have ceased, a pulse is applied to the signal fail detector 86. The operation of the coincident input gate 96 with respect to signal events C and D is the same.

If the signal fail detector 86 receives a pulse from any of the discrimination circuits (slave, rise time, or coincidence), an output pulse is applied to a signal fail gate 106 which enables the ΔT reject gate at the end of the time set in the master signal range time select 72 to apply the ΔT reject pulse to the computer interface 64 and the integrated circuits in the system are reset through the pulse generator 78. The signal fail gate 106 also receives the signal events A–D and the signal from the master signal range time select 72. Even in the absence of a pulse from the signal fail detector 86, if signals A–D are not all received within the time period selected in the master signal range time select 72, e.g., 100 to 5,000 microsec., the signal fail gate 106 is enabled and applies a pulse to the ΔT reject gate 76.

Any time the signal fail gate 106 is enabled an inhibit pulse is applied to the ΔT accept gate 74 to prevent application of the ΔT accept pulse to the computer interface 64.

In summary, the leading edge of the first event pulse generated by the threshold detectors 40 A–D activates the event detector 54 or 56 for a pair of channels (channel 1–2 or 3–4). For the duration of the time difference between arriving event pulse leading edges per channel pair a clock is enabled to provide clock pulses at the rate of 1 MHz. The time difference of arrival of the two signals appears in the form of a pulse train which expresses the time differences in microseconds. The master signal range time select 72 controls the maximum allowable time for signals to be received by all four channels. Generally, time durations between about 100 and about 5,000 microsec. are selected. If all four channels do not receive a signal within the selected time setting, a reset pulse is generated by a pulse generator 78. A reset pulse is also generated if slave signals are received prior to receipt of event pulses by all four data channels A–D, if the rise time of the signal events sensed by the rise time transducer is greater than a preselected value, or if the event signals received by channels 1, 2 or 3,4 are not coincident within a preselected time.

The interpretation of the arrival sequence data is such that the proper signs are assigned to the coordinates. It should be understood that if it is desired to use only channels 1 and 2 (two transducers), the system may be transformed to solve one dimensional problem.

The operation of the present invention with respect to accepting or rejecting data is as follows: All the master transducers used (two or more) must receive a signal within the maximum time limit selected by the master signal range time select 72. If, at the end of the selected time period, no signals have been registered from any of the discrimination circuits, a data accept pulse is generated by ΔT accept gate 74. If, at the end of the selected time period, any one of the discrimination circuits used registers a signal, a reject signal is generated by ΔT reject gate 76 and the processing unit 42 is reset by reset pulses to receive the next incoming data set.

Signals detected by the master input channels A–D are accepted and computer processed for flaw location if they satisfy the following criteria:

1. MASTER-SLAVE ARRANGEMENT:

The signals must be received by all the master transducers used (two or more) before receipt by any one of the slave transducers. The slave transducers are ganged together to provide a fifth channel and the master-slave input logic circuitry of the processing unit 42 determines whether the master signals have arrived prior to the slave signals and are accepted or rejected, on this basis.

2. RISE TIME DISCRIMINATION:

A sixth channel is used for rise time discrimination. A desired rise time is specified; e.g., a rise time between 25 and 250 microseconds. If the signal envelope ceases to rise before the preset time limit is reached, the signal is accepted. If the envelope continues to rise beyond this present time limit, a data reject pulse is generating in the processing unit 42.

3. COINCIDENCE DISCRIMINATION:

Independent coincidence detection is provided for the X and Y axes with variable resolution to limit the acceptance of the time arrival difference. The resolution may be varied in steps of one microsecond from zero.

The coincidence discrimination circuit requires that the two events arriving through two coincidence channels be coincident within a specific time limit. After the appearance of the leading edge of the first of the two events, the second event must arrive within the selected time for the signals to be acceptable. If the time arrival difference is beyond the selected time frame, a data reject pulse is generated in the processing unit 42.

All or selected spatial filtration techniques may be employed as determined by setting selector switches. The selections may include: 1. No discrimination (off); 2. Any of the individual dicsrimination methods; 3. The combination of rise time with coincidence; 4. Rise time and master-slave discrimination; 5. Master-slave and coincidence; or 6. Rise time, master-slave, and coincidence.

The computer interface 64, which is composed of digital counters and registers as is well known in the art, accepts the serial source location data from the processing unit 42 and rearranges it for parallel presentation to the digital computer 66. the arrival sequence of the serial data is sensed and a sign is assigned. If a reject pulse is received from the processing unit 42, the registers in the computer interface 64 are cleared and made ready for the acceptance of the next data set. Upon the arrival of the data accept pulse, the data is locked into the registers and is read into the memory of the digital computer 66. The sequence of data transfer may be made subject to an interrupt program in the computer 66. The computer interface 64 receives data from the four input lines in accordance with the four channel data presentation format or as two independent pairs of data receiving lines. In accordance, therewith, the computer 66 produces a solution for a single two dimensional source location problem or for a one dimensional problem; see Appendix A which discloses a basic language program for computer calculation of flaw source coordinates. Space may be allocated in the computer interface 64 for data transfer and control of a CRT display unit.

The digital computer 66 may be a Hewlett Packard 2100 digital computer having an 8K word memory. A line printer 68 which may be a Hewlett Packard 5050B Digital Printer provides a record of the linear X-Y coordinates of the flaw location referenced to the workpiece.

With the above described system it is apparent that extraneous signals and noises are prevented from indicating non-existent flaw source locations within the acoustic emission surveillance area. The data presented to the computer for processing is limited to valid flaw source location data, thereby reducing the computer memory and storage requirements.

It should be understood by those skilled in the art that various modifications may be made in the present invention without departing from the spirit and scope thereof as described in the specification and defined in the appended claims.

APPENDIX A

BASIC LANGUAGE PROGRAM FOR COMPUTER
CALCULATION OF FLAW SOURCE COORDINATES

```
100    REM - THIS IS THE EXECUTIVE ROUTINE
110    REM - SUBROUTINE NO.1 (1) MICROCIRCUIT DRIVER
120    REM - SUBROUTINE NO. 2 (2) PRINTER DRIVER
125    REM - SUBROUTINE NO.3 (3) SWITCH REGISTER DRIVER
134    CALL (3,S)
137    IF S   0 THEN 220
138    PRINT
140    PRINT "DETERMINATION OF ACOUSTIC EMISSION VELOCITY-"
150    PRINT "WITH RESPECT TO TWO(2) SENSORS AND A LINE - TYPE 1"
160    PRINT "WITH RESPECT TO FOUR SENSORS AND A PLANE - TYPE 2"
170    PRINT
180    PRINT "TO MONITOR EVENTS WITH RESPECT TO:"
190    PRINT "TWO (2) SENSORS AND A LINE-Y=MX+B- TYPE 3"
200    PRINT "FOUR (4) SENSORS AND A PLANE TYPE 4"
210    PRINT
220    PRINT "ENTER TEST TYPE DESIRED"
230    INPUT G 1
240    IF G 1<1 THEN 990
250    IF G 1=1 THEN 1000
260    IF G 1=2 THEN 2000
270    IF G 1=3 THEN 3000
280    IF G 1=4 THEN 4000
756    DIM U[8], V[8]
990    PRINT "INPUT ERROR - ENTER TEST TYPE NO. AGAIN"
995    GO TO 230
997    REM - T1 AND T2 IN SIGN ABSOLUTE-VALUE NOTATION IN MICROSECONDS
998    REM - END EXEC - START LINE VELOCITY
1000   PRINT
1010   PRINT "DETERMINATION OF ACOUSTIC VELOCITY FOR A LINE"
1020   PRINT
1040   PRINT "INPUT SENSOR POSITION (CM)"
1050   INPUT C1
1060   PRINT
1070   PRINT "INPUT 'M' AND 'B' FOR Y=MX+B (CM)"
1090   INPUT M,B
1100   PRINT
1110   PRINT "INPUT LOCATION OF EVENT X (CM)"
1130   INPUT E1
1140   LET C2=M*E1+B
1145   LET G 1=1
1147   CALL (4,R)
1148   WAIT (1)
1150   CALL (1,T1,T2)
1170   IF T1   0 THEN 1210
1180   PRINT "VELOCITY INDETERMINATE, T=O"
1190   GO TO 1900
1210   LET T1=T1*1.00000E-06
```

APPENDIX A-continued

BASIC LANGUAGE PROGRAM FOR COMPUTER CALCULATION OF FLAW SOURCE COORDINATES

```
1230  LET R1=ABS(SQR((C1-E1)↑2+C2↑2)-SQR((C1+E1)↑2+C2↑2))
1240  LET V1=ABS(R1/T1)
1245  IF G 1<0 THEN 1290
1250  PRINT
1260  PRINT "VELOCITY (CM/SEC)"
1280  LET G 1=-1
1290  PRINT TAB(8),V1
1900  CALL (3,S)
1910  IF S=1 THEN 1147
1920  IF S=2 THEN 1110
1930  IF S=4 THEN 1070
1940  IF S=8 THEN 1040
1950  GO TO 220
1999  REM - END LINE "VELOCITY PROG - START PLANE VELOCITY"
2000  PRINT
2010  PRINT "DETERMINATION OF ACOUSTIC EMISSION VELOCITY IN A PLANE"
2020  PRINT
2030  PRINT "INPUT X AND Y AXIS SENSOR POSITIONS (CM)"
2040  INPUT C1,C2
2050  PRINT
2060  PRINT "INPUT LOCATION OF EVENT X,Y (CM)"
2070  INPUT E1,E2
2080  LET G 1=1
2085  CALL (4,R)
2086  WAIT (1)
2090  CALL (1,T1,T2)
2102  IF T1  0 AND T2  0 THEN 2110
2108  PRINT "VELOCITY INDETERMINATE, T=0"
2109  GO TO 2210
2110  LET T1=T1*1.00000E-06
2130  LET T2=T2*1.00000E-06
2140  LET R1=ABS(SQR((C1-E1) 2+E2 2)-SQR((C1+E1) 2+E2 2))
2150  LET R2=ABS(SQR((C2-E2) 2+E1 2)-SQR((C2+E2) 2+E1 2))
2160  LET V1=ABS(R1/T1)
2170  LET V2=ABS(R2/T2)
2175  IF G 1<0 THEN 2206
2180  PRINT
2190  PRINT "VELOCITY (CM/SEC)"
2204  LET G 1=-1
2206  PRINT TAB(8),V1,V2
2210  CALL (3,S)
2220  IF S=1 THEN 2085
2230  IF S=2 THEN 2060
2235  IF S=4 THEN 2030
2240  GO TO 220
2250  REM - END PLANE VELOCITY PROG - START LINE MONITORING
3000  PRINT
3010  PRINT "EVENT MONITORING - LINE"
3020  PRINT
3030  PRINT "INPUT X AXIS SENSOR POSITION (CM)"
3040  INPUT C1
3045  LET C1=C1 2
3050  PRINT
3060  PRINT "INPUT VELOCITY (CM/SEC)"
3070  INPUT V1
3080  PRINT
3090  PRINT "INPUT 'M' AND 'B' FOR Y=MX+B (CM)"
3100  INPUT M,B
3115  CALL (4,R)
3120  CALL (1,T1,T2)
3130  IF T1=0 THEN 3270
3140  LET T1=T1*1.00000E-06
3150  LET A1=.5*V1*T1
3160  LET A1=A1*A1
3170  LET F1=C1-A1
3180  LET A6=F1-A1*M*M
3190  LET B6=2*A1*B*M
3200  LET C6=A1*B*B+A1*F1
3210  LET R1=(B6*B6+4*A6*C6)
3212  IF R1<0 THEN 3270
3214  LET R1=SQR(R1)
3220  LET X=(B6+R1)/(2*A6)
3230  IF X 2>2.25*C1 THEN 3270
3240  IF T1>0 THEN 3250
3245  LET X=-X
3250  LET Y=M*X+B
3255  LET X=INT((X+5.00000E-02)*10)
3256  LET Y=INT((Y+5.00000E-02)*10)
3260  CALL (2,X,Y)
3270  CALL (3,S)
3280  IF S=1 THEN 3115
3290  IF S=2 THEN 3080
3300  IF S=4 THEN 3050
3310  IF S=8 THEN 3020
3320  GO TO 220
3995  REM - END LINE MONITORING PROG - START PLANE MONITORING
4000  PRINT
4005  PRINT "EVENT MONITORING - PLANE"
4006  PRINT
4010  PRINT "INPUT X AND Y SENSOR POSITIONS (CM)"
4015  INPUT C1,C2
```

APPENDIX A-continued

BASIC LANGUAGE PROGRAM FOR COMPUTER CALCULATION OF FLAW SOURCE COORDINATES

```
4018 PRINT
4020 LET C1=C1 2
4022 LET C2=C2 2
4030 PRINT "INPUT VELOCITIES V1,V2"
4040 INPUT V1,V2
4045 CALL (4,R)
4050 CALL (1,T1,T2)
4070 LET T1=T1*1.00000E-06
4080 LET T2=T2*1.00000E-06
4090 LET A1=.5*V1*T1
4100 LET A2=.5*V2*T2
4110 LET A1=A1*A1
4120 LET A2=A2*A2
4140 LET F1=C1-A1
4145 LET F2=C2-A2
4150 LET F3=A1*A2
4160 LET D=F1*F2-F3
4170 LET D1=A1*F1*F2+F3*F2
4180 LET D2=A2*F1*F2+F3*F1
4190 IF D <= 0 THEN 4290
4200 LET X=SQR(ABS(D1/D))
4210 LET Y=SQR(ABS(D2/D))
4215 IF X 2>2.25*C1 OR Y 2>2.25*C2 THEN 4290
4216 LET X=INT((X+5.00000E-02)*10)
4217 LET Y=INT((Y+5.00000E-02)*10)
4220 IF T1>0 THEN 4240
4230 LET X=-X
4240 IF T2>0 THEN 4260
4250 LET Y=-Y
4260 CALL (2,X,Y)
4290 CALL (3,S)
4300 IF S=1 THEN 4045
4310 IF S=2 THEN 4030
4320 IF S=4 THEN 4010
4325 IF S=5 THEN 9999
4340 GO TO 220
5000 REM - FLOATING POINT TO BCD CONVERSION SUBROUTINE
5020 FOR I1=1 TO 2
5030 IF I1=1 THEN 5060
5040 LET Q=Y
5050 GO TO 5070
5060 LET Q=X
5070 LET S5=Q
5080 LET K=10000
5090 IF Q >= 0 THEN 5140
5100 LET V[1]=11
5110 LET Q=-Q
5120 LET S5=-S5
5130 GO TO 5150
5140 LET V[1]=10
5150 FOR I2=2 TO 6
5160 LET V[I2]=INT((Q+5.00000E-02)/K)
5170 LET Q=Q-V[I2]*K
5180 LET K=K/10
5190 NEXT I2
5200 LET V[7]=15
5210 LET V[8]=INT(((S5-INT(S5))*100+5)/10)
5214 IF V[8]<10 THEN 5220
5216 LET V[8]=0
5220 IF I1=2 THEN 5260
5230 FOR I3=1 TO 8
5240 LET U[I3]=V[I3]
5250 NEXT I3
5260 NEXT I1
5270 CALL (2,U[1],V[1])
5280 RETURN
9999 END
```

What is claimed is:

1. A process for determining acoustic emission flaw source location in workpieces, comprising the steps of:
   a. arranging at least two transducers in a spaced array to receive acoustic flaw source signals;
   b. spatially filtering any signals received by the transducers to reject those signals which are beyond a predetermined signal source proximity to the transducers as determined by predetermined time relationships between the signals received by the transducers by:
      i. detecting the rise times of the received signals;
      ii. rejecting those signals received by the transducers which have a rise time greater than a predetermined value;
      iii. detecting the time coincidence of the signals received by the transducers;
      iv. rejecting those signals which are outside of a preselected time coincidence; and
   c. electronically computing the coordinates of the sources of the acoustic emission signals from the non-rejected signals to provide an accurate determination of acoustic emission flaw source locations.

2. The process claimed in claim 1 wherein the step of spatially filtering includes:
   arranging at least one slave transducer outside of the two transducer array;

rejecting those signals received by the slave transducer prior to receipt by the two transducers of the transducer array.

3. A process for determining acoustic emission flaw source location in workpieces, comprising the steps of:
   a. arranging at least two transducers in a spaced array to receive acoustic flaw source signals;
   b. spatially filtering any signals received by the transducers to reject those signals which are beyond a predetermined signal source proximity to the transducers as determined by predetermined time relationships between the signals received by the transducers by:
      i. detecting the rise times of the received signals;
      ii. rejecting those signals received by the transducers which have a rise time greater than a predetermined value;
      iii. arranging at least one slave transducer outside of the two transducer array;
      iv. rejecting those signals received by the slave transducer prior to receipt by the two transducers of the transducer array; and
   c. electronically computing the coordinates of the sources of the acoustic emission signals from the non-rejected signals to provide an accurate determination of acoustic emission flaw source locations.

4. A process for determining acoustic emission flaw source location in workpieces, comprising the steps of:
   a. arranging at least two transducers in a spaced array to receive acoustic flaw source signals;
   b. spatially filtering any signals received by the transducers to reject those signals which are beyond a predetermined signal source proximity to the transducers as determined by predetermined time relationships between the signals received by the transducers by:
      i. detecting the time coincidence of the signals received by the transducers;
      ii. rejecting those signals received by the transducers which are outside of a predetermined time coincidence;
      iii. arranging at least one slave transducer outside of the two transducer array;
      iv. rejecting those signals received by the slave transducer prior to receipt by the two transducers of the transducer array; and
   c. electronically computing the coordinates of the sources of the acoustic emission signals from the non-rejected signals to provide an accurate determination of acoustic emission flaw source locations.

5. A process for determining acoustic emission flaw source location in workpieces, comprising the steps of:
   a. arranging two pairs of transducers in a spaced array with the first pair of transducers arranged perpendicular to the second pair of transducers with the first pair of transducers located at the extremities of an X-axis and the second pair of transducers located at the extremities of a Y-axis to provide an X-Y coordinate system for the array to receive acoustic flaw source signals;
   b. spatially filtering any signals received by the transducers to reject those signals which are beyond a predetermined signal source proximity to the transducers as determined by predetermined time relationships between the signals received by the transducers; and
   c. electronically computing the coordinates of the sources of the acoustic emission signals from the non-rejected signals to provide an accurate determination of acoustic emission flaw source locations.

6. The process claimed in claim 5 wherein the step of spatially filtering includes:
   arranging a rise time transducer at the center of the X-Y coordinate system;
   rejecting those signals received by the X-Y coordinate system transducers when the rise time of the signals received by the rise time transducer is greater than a predetermined value.

7. The process claimed in claim 6 wherein the step of spatially filtering includes:
   detecting the time coincidence of the signals received by the X-Y coordinate system transducers;
   rejecting those signals received by X-Y coordinate transducers which are outside of a preselected time coincidence.

8. The process claimed in claim 7 wherein the step of spatially filtering includes:
   arranging at least one slave transducer outside of the X-Y coordinate system transducer array;
   rejecting those signals received by the slave transducer prior to receipt by all of the transducers of the X-Y coordinate system transducer array.

9. The process claimed in claim 6 wherein the step of spatially filtering includes:
   arranging at least one slave transducer outside of the X-Y coordincate system transducer array;
   rejecting those signals received by the slave transducer prior to receipt by all of the transducers of the X-Y coordinate system transducer array.

10. The process claimed in claim 5 wherein the step of spatially filtering includes:
    arranging at least one slave transducer outside of the X-Y coordinate system transducer array;
    rejecting those signals received by the slave transducer prior to receipt by all of the transducers of the X-Y coordinate system transducer array.

11. The process claimed in claim 5 wherein the step of spatially filtering includes:
    detecting the time coincidence of signals received by the X-Y coordinate system transducers;
    rejecting those signals detected by the X-Y coordinate system transducers which are outside of a predetermined time coincidence.

12. The process claimed in claim 11 wherein the step of spatially filtering includes:
    arranging at least one slave transducer outside of the X-Y coordinate system transducer array;
    rejecting those signals received by the slave transducer prior to receipt by all of the transducers of the X-Y coordinate system transducer array.

13. A system for determining acoustic emission flaw source location in workpieces, comprising:
    a. at least two transducers positioned in a spaced array to receive acoustic emission flaw source signals;
    b. processing means for spatially filtering any signals received by the transducers to reject those signals which are beyond a predetermined signal source proximity to the transducers as determined by predetermined time relationships between the signals received by the transducers, said processing means for spatially filtering including means for detecting the rise times of the received signals, means for rejecting those signals detected by the transducers which have rise times greater than a predetermined value, means for detecting the time coincidence of the signals received by the transducers, means for rejecting those signals detected by the transducers which are outside of a preselected time coincidence; and c. computer means coupled to said processing means for receiving output signals therefrom, said computer means computing the coordinates of the source of the acoustic emission signals in response to output signals from said processing means to provide an accurate determination of acoustic emission flaw source locations.

14. The system claimed in claim 13 wherein:
said processing means for spatially filtering includes at least one slave transducer positioned outside of the transducer array, and means for rejecting those signals received by the slave transducer prior to receipt by the two transducers of the transducer array.

15. A system for determining acoustic emission flaw source location in workpieces, comprising:

a. at least two transducers positioned in a spaced array to receive acoustic emission flaw source signals;

b. processing means for spatially filtering any signals received by the transducers to reject those signals which are beyond a predetermined signal source proximity to the transducers as determined by predetermined time relationships between the signals received by the transducers, said processing means for spatially filtering including means for detecting the rise times of the received signals, means for rejecting those signals detected by the transducers which have rise times greater than a predetermined value, at least one slave transducer positioned outside of the transducer array, and means for rejecting those signals received by the slave transducer prior to receipt by the two transducers of the transducer array; and c. computer means coupled to said processing means for receiving output signals therefrom, said computer means computing the coordinates of the source of the acoustic emission signals in response to output signals from said processing means to provide an accurate determination of acoustic emission flaw source locations.

16. A system for determining acoustic emission flaw source location in workpieces, comprising:

a. at least two transducers positioned in a spaced array to receive acoustic emission flaw source signals;

b. processing means for spatially filtering any signals received by the transducers to reject those signals which are beyond a predetermined signal source proximity to the transducers as determined by predetermined time relationships between the signals received by the transducers, said processing means for spatially filtering including means for detecting the time coincidence of the signals received by the transducers, means for rejecting those signals detected by the transducers which are outside of a predetermined time coincidence, at least one slave transducer positioned outside of the transducer array, and means for rejecting those signals received by the slave transducer prior to receipt by the two transducers of the transducer array; and c. computer means coupled to said processing means for receiving output signals therefrom, said computer means computing the coordinates of the source of the acoustic emission signals in response to output signals from said processing means to provide an accurate determination of acoustic emission flaw source locations.

17. A system for determining acoustic emission flaw source location in workpieces, comprising:

a. two pairs of transducers arranged in a spaced array with the first pair of transducers arranged perpendicular to the second pair of transducers with the first pair of transducers located at the extremities of an X-axis and the second pair of transducers located at the extremities of a Y-axis to provide an X-Y coordinate system for the array to receive acoustic emission flaw source signals;

b. processing means for spatially filtering any signals received by the transducers to reject those signals which are beyond a predetermined signal source proximity to the transducers as determined by predetermined time relationships between the signals received by the transducers; and c. computer means coupled to said processing means for receiving output signals therefrom, said computer means computing the coordinates of the source of the acoustic emission signals in response to output signals from said processing means to provide an accurate determination of acoustic emission flaw source locations.

18. The system claimed in claim 17 wherein:
said processing means for spatially filtering includes a rise time transducer positioned at the center of the X-Y coordinate system, and means for rejecting those signals received by the X-Y coordinate system transducers when the rise time of the signals received by the rise time transducer is greater than a predetermined value.

19. The system claimed in claim 18 wherein:
said processing means for spatially filtering includes means for detecting the time coincidence of the signals received by the X-Y coordinate system transducers, and means for rejecting those signals received by the X-Y coordinate system transducers which are outside of a preselected time coincidence.

20. The system claimed in claim 19 wherein:
said processing means for spatially filtering includes at least one slave transducer positioned outside of the X-Y coordinate system transducer array, and means for rejecting those signals received by the slave transducer prior to receipt by all of the transducers of the X-Y coordinate system transducer array.

21. The system claimed in claim 18 wherein:
said processing means for spatially filtering includes at least one slave transducer positioned outside of the X-Y coordinate system transducer array, and means for rejecting those signals received by the slave transducer prior to receipt by all of the transducers of the X-Y coordinate system transducer array.

22. The system claimed in claim 17 wherein:
said processing means for spatially filtering includes at least one slave transducer positioned outside of the X-Y coordinate system transducer array, and means for rejecting those signals received by the slave transducer prior to receipt by all of the transducers of the X-Y coordinate system transducer array.

23. The system claimed in claim 17 wherein:
said processing means for spatially filtering includes means for detecting the time coincidence of signals received by the X-Y coordinate system transducers, and means for rejecting those signals detected by the X-Y coordinate system transducers which are outside of a predetermined time coincidence.

24. The process claimed in claim 23 wherein:
said processing means for spatially filtering includes at least one slave transducer positioned outside of the X-Y coordinate system transducer array, and means for rejecting those signals received by the slave transducer prior to receipt by all of the transducer of the X-Y coordinate system transducer array.

* * * * *